United States Patent
Hashimoto et al.

[15] 3,665,812
[45] May 30, 1972

[54] APPARATUS FOR CONTROLLING RECTILINEAR MOTION

[72] Inventors: Yoshiaki Hashimoto, Nagoya; Masatosi Hayakawa, Komaki, both of Japan

[73] Assignee: Chukyo Electric Co., Ltd., Komaki-shi, Aichi-ken, Japan

[22] Filed: June 22, 1970

[21] Appl. No.: 48,262

[30] Foreign Application Priority Data

July 1, 1969 Japan..................................44/51500
July 18, 1969 Japan..................................44/56430

[52] U.S. Cl. ......................................92/24, 92/27, 188/67, 188/365
[51] Int. Cl. ........................................F15b 15/22, B65h 59/10
[58] Field of Search ..................188/67, 365; 92/27, 28, 23, 92/24

[56] References Cited

UNITED STATES PATENTS

| | | | |
|---|---|---|---|
| 1,650,013 | 11/1927 | Gartin | 92/28 X |
| 2,775,869 | 1/1957 | Pointer | 188/67 |
| 3,264,943 | 8/1966 | Schmitt | 92/28 X |

*Primary Examiner*—George E. A. Halvosa
*Attorney*—Kurt Kelman

[57] ABSTRACT

An apparatus for controlling rectilinear motion supplying fluid to the interior of a certain substance performing rectilinear motion along the guide, to expand the elastic body mounted on the substance, causing the elastic body to engage frictionally with the guide, whereby to make the substance stop abruptly, start or stop slowly, vary the speed, move steppingly, and perform clutch action.

3 Claims, 13 Drawing Figures

INVENTORS
YOSHIAKI HASHIMOTO
MASATOSI HAYAKAWA
BY
Kurt Kelman
AGENT

Patented May 30, 1972

INVENTORS
YOSHIAKI HASHIMOTO
MASATOSI HAYAKAWA
BY
Kurt Kelman
AGENT

APPARATUS FOR CONTROLLING RECTILINEAR MOTION

BACKGROUND OF THE INVENTION

The present invention relates to an apparatus for controlling a rectilinear motion of a substance utilizing pressure of fluid.

In order to control the rectilinearly moving substance in such manners as to stop it abruptly, start or stop it slowly, vary its speed, make it move steppingly and the clutching operation, various kinds of mechanical or electrical machines have been suggested. Such machines are, in general, very complicated in structure and also very expensive. Especially, the controlling apparatus utilizing fluid has to be in large scale and is very difficult to control the motion accurately.

Heretofore, for example, in controlling rectilinear motion of the double-acting cylinder, a known electro-fluidic pressure positioner is provided to the cylinder in order to stop the piston at the desired position. In this control system, however, the structure has to be necessarily very complicated and expensive. Moreover, particularly in the system utilizing pneumatic pressure, the hunting movement of the piston becomes violent when the piston is stopped abruptly resulting poor response properties and unsatisfactory accuracy.

Accordingly, it is a general object of this invention to provide a rectilinear motion control apparatus which is simple in structure, inexpensive and utilizing fluidic pressure capable of performing accurate control.

A further object of the invention is to provide a simple-structured and inexpensive rectilinear motion control apparatus, utilizing fluidic pressure and performing accurate control of a certain substance doing rectilinear motion in such manners as abrupt stopping, slow starting and stopping, varying the speed, stepping motion, and clutch operations.

A still further object of this invention is to provide a simple-structured and inexpensive rectilinear motion control cylinder utilizing fluidic pressure and performing accurate control of a piston of a fluidic-pressure operated cylinder doing rectilinear motion in such manners as abrupt stopping, slow starting and stopping, varying the speed, stepping motion, etc.

SUMMARY OF THE INVENTION

The apparatus for controlling rectilinear motion according to the present invention comprises a bag-shaped elastic body maintained in the shaft moving in connection with a certain substance performing rectilinear motion, a fixed housing to guide the motion of the said shaft and to contact the bag-shaped bottom of the said elastic body, supplies the fluid from the source of supply of fluid through the conduits provided in the said shaft to the bag-shaped space of the said elastic body, makes the bag-shaped bottom of the said elastic body frictionally contact or discontact the said housing by increasing or decreasing the pressure of the fluid, thereby to control the motion of the said substance.

In order to prevent the bag-shaped bottom of said elastic body from wearing away and obtain favorable frictional contact, afriction piece may be mounted on the bottom of the elastic body.

If gaps are provided between the holder of the moving shaft and the elastic body and at least two assemblies are combined, stepping motion of the shaft is made possible by alternately increasing and decreasing the pressure of the fluid.

Another embodiment of the rectilinear motion control apparatus according to the present invention comprises at least two bag-shaped elastic bodies held on the piston rod of the fluid cylinder moving rectilinearly, friction pieces mounted on the bottoms of the said bag-shaped elastic bodies, gaps δ between the holder maintaining the said elastic bodies on the piston rod and the end face of the said friction pieces, conducts the fluid from the source of supply of fluid through the control valve and the conduits independently provided in the piston rod wherefrom to the bag-shaped spaces in the said plastic bodies, simultaneously increases the pressure of the fluid in the bag-shaped spaces of two sets of the said elastic bodies by operation of said control valve or alternately operates the two sets of the said elastic bodies one by one by the pressure pulse generated by the said control valve whereby to make the said friction pieces contact or discontact the barrel of the said cylinder resulting braking rectilinear motion or allowing stepping motion of the piston.

In addition, a position indicator may be provided on the piston rod so that it may be detected by the detector to be able to accurately control the rectilinear motion of the piston by returning the output to the control valve or to serve as a displacement indicator by conducting the output of the detector to the meters.

DETAILED DESCRIPTION OF THE PREFERRED EMBODIMENTS

Several embodiments according to the present invention will be disclosed in association with the figures as follows.

Figure 1:
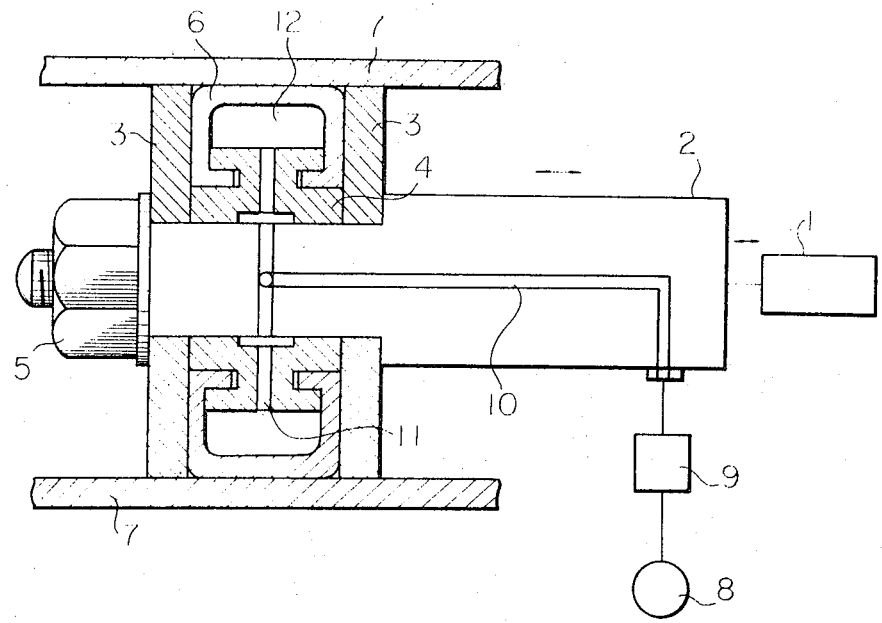
FIG. 1 is a sectional view of a rectilinear motion controlling apparatus of the present invention.

In FIG. 1, a known rectilinear motion driving device 1 (e.g., a pneumatic or oil pressure cylinder, crank-piston mechanism, pinion-rack mechanism, etc.) is connected to a shaft 2. At the left end of the shaft 2, a couple of sliding boards 3 are fixed by usual fixing element 5 such as set screw or nut with holders 4 held between the shaft 2 and sliding boards 3. Between the sliding boards and the holder an elastic ring 6 having C-shaped section is mounted. The elastic ring 6 is made of material with strong elasticity such as rubber, synthetic resin, phosphorus bronze and the like. A fixed housing 7 is arranged along the external sides of the sliding boards 3 and elastic ring 6.

Fluid under pressure is poured from a fluid supply source 8 through the pressure control valve 9, the conduit 10 equipped inside of the shaft 2 and the conduit 11 equipped inside of the holder 4 into the inner space 12 of the elastic ring 6.

The shaft 2 is inter-connected with the rectilinear driving device and perform rectilinear motion along the axial direction within the housing 7. Under the normal condition, the sliding board 3 and the elastic ring 6 are arranged beforehand so that the exterior surface of the sliding board 3 will be slidingly engaged with the interior surface of the housing 7 and the elastic ring 6 will not contact the interior surface of the housing 7 at all or will contact it only slightly.

When the pressure of fluid in the inner space 12 of the elastic ring 6 is raised over the established level by operating the pressure control valve 9, the elastic ring 6 is expanded by the pressure of the fluid. Exterior surface of the elastic ring 6 is frictionally engaged with the interior surface of the housing 7 to apply brake to the movement of the shaft 2.

According, such control of the movement of the cylinder 2 as abrupt stopping, slow starting and stopping, varying the speed, etc. may be rendered by regulating the pressure of the fluid.

Figure 2:
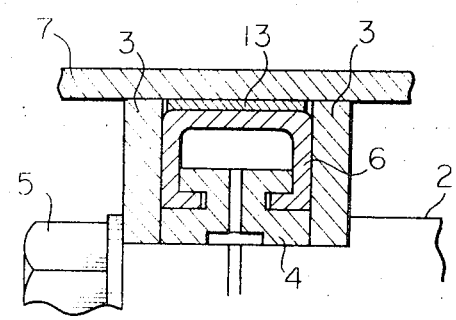
FIG. 2 is a sectional view of another embodiment of the present invention.

As the exterior surface of the elastic ring 6 has to repeat strong frictional contact with the interior surface of the housing 7, it is desirable to attach a friction piece 13 to the exterior surface of the elastic ring 6 as illustrated in FIG. 2 in order to prevent the elastic ring 6 from being worn away and damaged and to obtain better frictional contacting. The friction piece 13 is made of such materials as hard rubber, felt, glass fiber, soft metals, etc.

Figure 3:
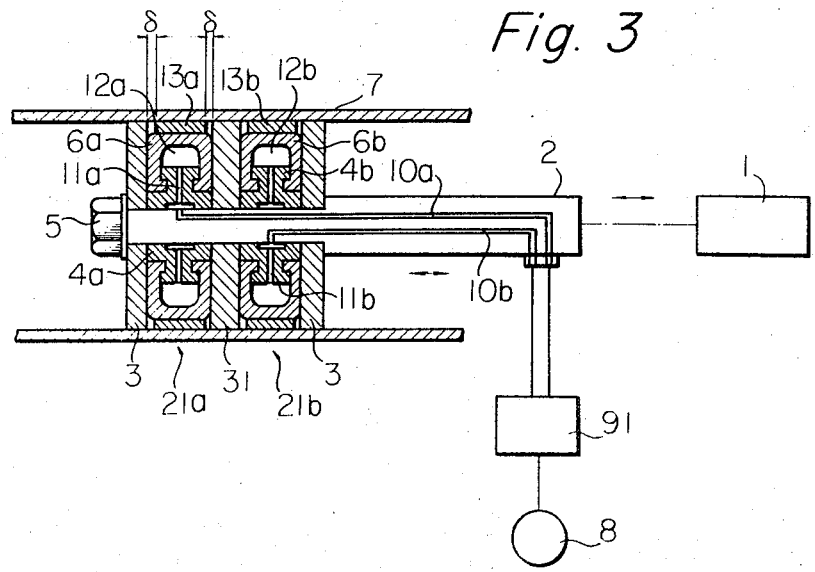
FIG. 3 is a sectional view of still another embodiment of the present invention comprising a couple of the rectilinear motion controlling apparatuses illustrated in FIG. 2.

The embodiment illustrated in FIG. 3 comprises two sets of the assemblies 21 combined in series. By virtue of this structure, various controls of the movement is possible as described hereunder.

Each assemblies 21a and 21b are practially the same as illustrated in FIG. 2. Sliding board 31 is common with the both assemblies. Fluid is supplied from the fluid supply source 8 through the control valve 91 having regulating and switching functions, conduits 10a and 10b provided in the shaft 2 and conduits 11a and 11b provided respectively in the holders 4a and 4b to inner spaces 12a and 12b respectively. Accordingly, passages to supply fluid to each assemblies 21a and 21b are independent from each other.

As illustrated in FIG. 3, gaps $\delta$ are provided between the friction piece 13a and the sliding boards 3 and 31 respectively in the axial direction. The same is with the friction piece 13b. These gaps $\delta$ perform a very important function as described hereunder.

In the structure illustrated in FIG. 3, when the assemblies 21a and 21b are simultaneously operated by the control valve 91 or when only one of them is independently operated, they perform the same function as explained in connection with FIGS. 1 and 2. But when the assemblies 21a and 21b are alternately operated by the control valve 91, they can move the shaft 2 forward or backward in stepping motion.

Figure 4A:
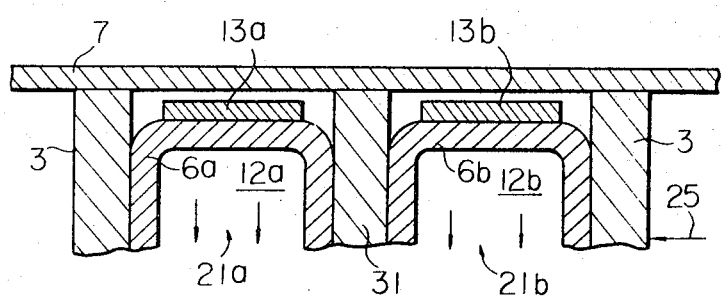
FIGS. 4a to 4e are schematic sectional views illustrating sequential movements of an embodiment of the present invention.
Figure 4B:
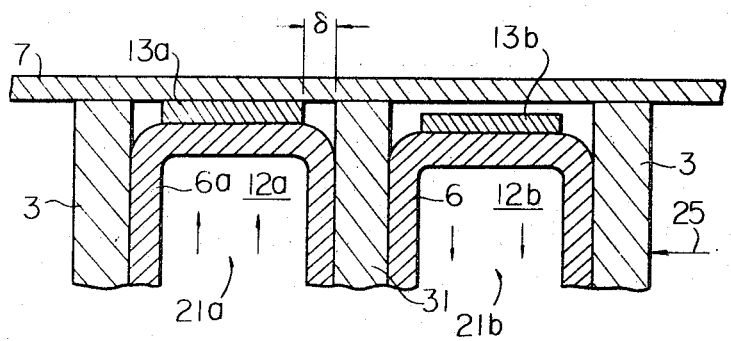
Figure 4C:
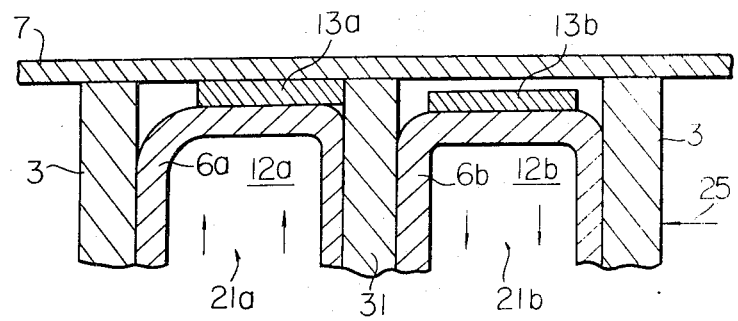

In the structure illustrated in FIG. 3, the shaft 2 is assumed that it is being driven by the driving device 1 to move rectilinearly to the left. The, if the assemblies 21a and 21b are operated alternately, the cylinder moves to left in a stepping way as illustrated in FIGS. 4a to 4c, wherein movement of each component is shown in an idealized and exaggerated manner for the sake of convenience in explanation. In the actual movement, some transient phenomena should appear. But these transient phenomena may be regarded as to have passed in such a short time as to be practically neglected.

FIG. 4(a) shows a state wherein neither assemblies 21a nor 21b is operated. In other words, the pressure of fluids within the inner spaces 12a and 12b of the elastic rings 6a and 6b is under the established level, said elastic rings 6a and 6b remaining under the normal condition wherein the friction pieces 13a and 13b are kept separating from the interior surface of the housing 7.

FIG. 4(b) shows a state wherein only assembly 21a is operated, namely the pressure of fluids within the space 12a is raised over the established level causing the elastic ring 6a to expand thereby to slightly push the friction piece radially so far as it touches the interior surface of the housing 7. The frictional contact of the friction piece 13a to the interior surface of the housing 7 stops the forward movement of the shaft 2 instantaneously. But the shaft 2 stays under the influence of the driving force (shown by arrow 25) of the driving device 1.

FIG. 4(c) shows a state wherein the assembly 21 namely the shaft 2 is moved forward as far as the length of the gap $\delta$. The friction piece 13a does not move forward since the friction piece 13a is frictionally contacted strongly with the interior surface of the housing 7. However, since the shaft 2 namely the sliding boards 3 and 31 are under the driving force 25 all the time, they transform the right side of the elastic ring 6a to move forward as far as the length of the gap $\delta$, and the sliding board 31 stops being obstructed by the end face of the friction piece 13a.

Figure 4D:
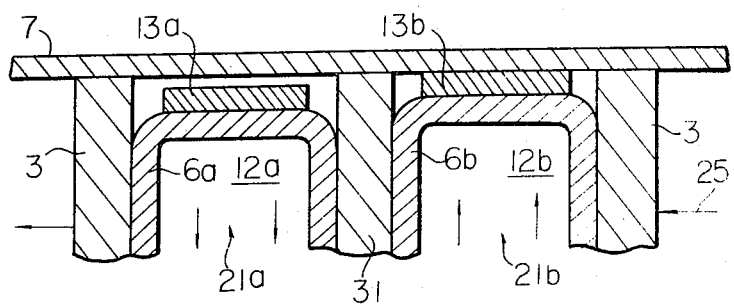

FIG. 4(d) shows a state wherein the assembly 21a is disengaged while the assembly 21b is operated to engage. The assembly 21b repeats the same operation of the assembly 21a as described in connection with the FIG. 4(b). Then, the fluid pressure within the assembly 21a is abruptly lowered under the established level and the elastic ring 6a instantaneously restores its original form.

Figure 4E:
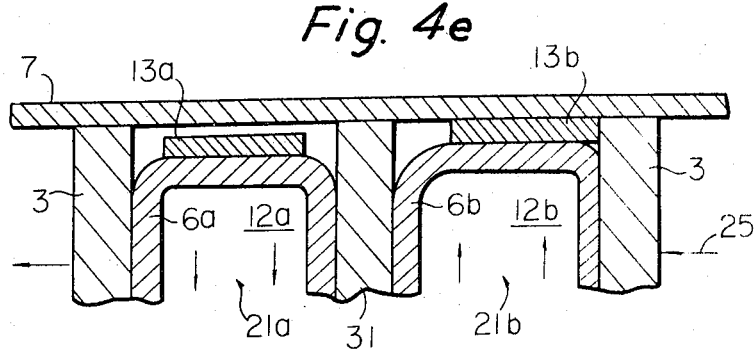

FIG. 4(e) shows a state wherein the shaft 2 is moved forward as far as the length of the gap $\delta$ through the steps of operations same as described in connection with FIG. 4(c).

Hereafter the same operations are repeated in turn to enable the shaft 2 to perform stepping movement. In the description of operations in connection with FIG. 4, the assembly 21a is mentioned as to be operated first. But, on the contrary, even if the assembly 21b is to be operated first, the same result will be obtained. It will be obvious also that the result will be the same if the shaft is being driven so as to be moved backward to the right.

Figure 5A:
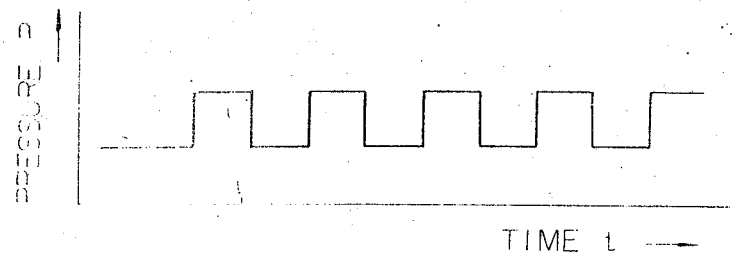
FIGS. 5a to 5c illustrate graphically a series of motions of the embodiment illustrated in FIGS. 4a to 4c.
Figure 5B:
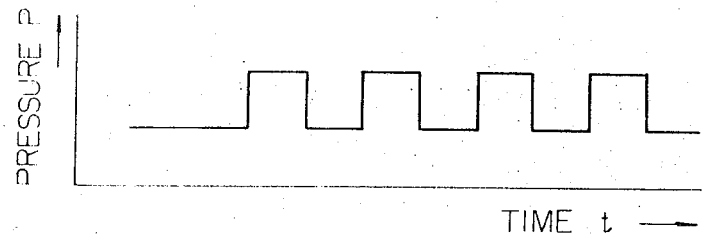
Figure 5C:
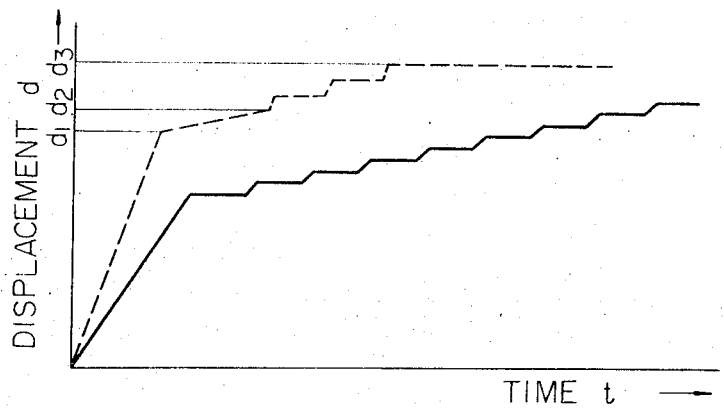

FIGS. 5a to 5c graphically illustrates the operations described in relation to FIGS. 4a to 4c. FIGS. 5(a) and (b) show pressure pulses applied to assemblies 21a and 21b respectively. These pressure pulses are generated by composing the control valve 9 in the known manner. By utilizing the switching circuit and pulse generating circuit provided with a fluidics device, all the control systems are advantageously unified to the fluidic operations.

FIG. 5(c) is a graph showing displacement of the shaft 2 with passage of time. The solid line graph responds to the shift of the shaft 2 in connection with FIG. 4. As the dotted line shows, by making the shaft 2 rapidly draw closely to the position $d_1$, go slowly to $d_2$ and then repeat step motions several times, the shaft can easily be stopped at the aimed position through the said accurate locating movements.

Figure 6:
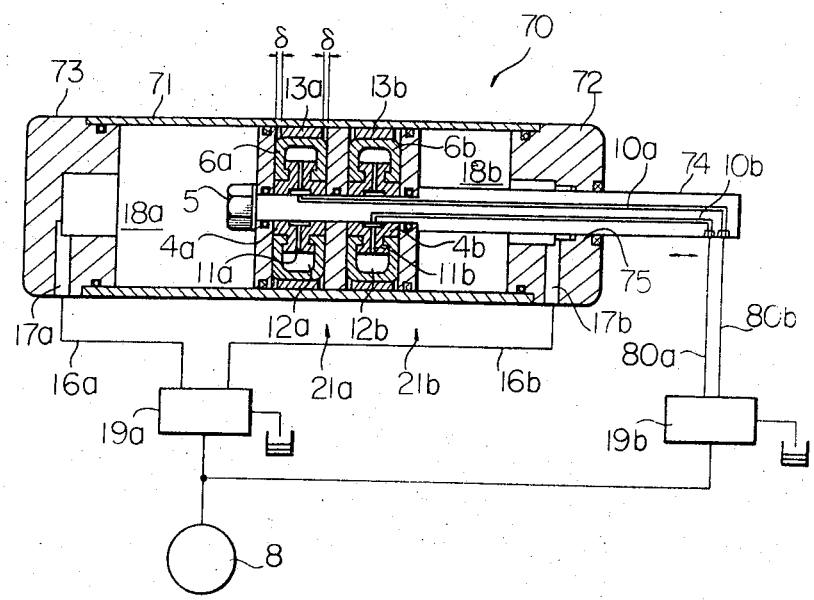
FIG. 6 is a schematic sectional view of an embodiment applied in a fluid cylinder.

FIG. 6 illustrates an embodiment wherein the assemblies 21a and 21b shown in FIG. 3 are applied in the known fluid cylinder 70. In the fluid cylinder 70, at the both ends of the barrel 71, the front wall 72 and the rear wall 73 are fixed respectively. The piston rod 74 is supported at the hole 75 of the front wall 72 so as to slide freely. At the end of the piston rod 74, the assemblies 21a and 21b are mounted by the fixing element 5.

The fluid (e.g., air, water, oil, etc.) under pressure supplied from the source 8 is conducted through the control valve 19a, the conduits 16a, 16b and respectively the passages 17a provided in the rear wall 73 and 17b provided in the front wall 72 and then supplied respectively to the spaces 18a and 18b provided in the barrel 71. As widely known, the piston rod 74 can be moved horizontally by regulating the pressure of the fluid in the spaces 18a and 18b within the barrel 71.

The fluid under pressure from the fluid supply source 8 is conducted through the control valve 19b, conduits 80a, 80b and supplied to the conduits 10a, 10b provided in the piston rod 74 and thence through the holes 11a, 11b provided in the holders 4a, 4b of the assemblies 21a, 21b to the spaces 12a, 12b within the elastic rings 6a and 6b.

The movements of the fluid cylinder 70 are the same as those described in connection with FIGS. 3, 4 and 5. Namely, under the normal condition, the piston rod 74 performs rectilinear or reciprocating movement by regulating the pressure of the fluid in the spaces 18a and 18b within the shaft 2 by the control valve 19a. And by applying control pulse to the control valve 19b, it is possible also to do the step movements described above.

In FIG. 6, it is shown that the same fluid supply source 8 is commonly used for operating the piston and braking the piston. But, of course, two different sources of supply of fluid (not illustrated) may be used for different purposes. purposes. In this case, air may be used for operating the piston and oil for braking the piston, or vice versa.

Figure 7:
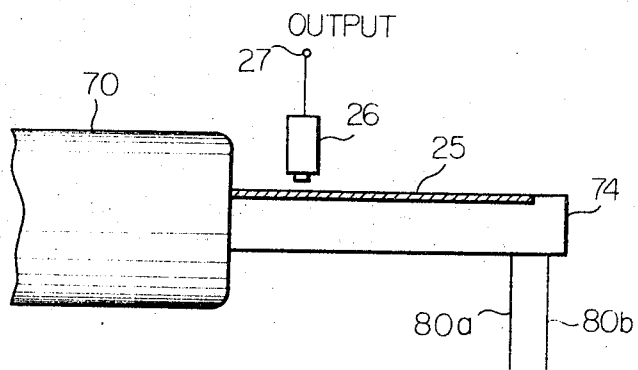
FIG. 7 shows a partial side view of the embodiment illustrated in FIG. 6 wherewith attached a detector.

As illustrated in FIG. 7, along the longitudinal direction of the piston rod 74, the indicator 25 is provided, the position of which is detected by the detector 26 provided adjacent to the piston rod 74. The output 27 of the detector 26 is returned, for example, to the control valve 19a (FIG. 6) and may be utilized in correcting the piston movement accurately and as a displacement detector being connected with meters (not figured).

The indicator 25 may be made of electric-insulator, magnetic material or optical reflecting material with regular concaves and convexes. In this case, the detector 26 may utilize electric conducting contact arm, magnetic head or phototransistor, etc.

As is obvious from the foregoing description, the step-movement of the rectilinear motion control apparatus may be altered in any manner desired by changing the length of the gap δ. By supporting the fixed housing so that it can do rectilinear or rotatary motion, the rectilinear motion control apparatus may serve as a clutch. In place of the elastic ring, a plurality of small size cylinders may be radially arranged. In addition, by combining the rectilinear motion control apparatus illustrated in FIG. 3 with a rotary motion body, it can do relatively complicated compound motions. Particularly, when the rectilinear motion control apparatus is utilized in pneumatic cylinder, it enables various operations such as stopping at any desired position, stepping feeding, accurate decision of the stopping position, etc., which are heretofore considered as very difficult, may be performed very easily and inexpensively. Thus, the rectilinear motion control apparatus according to the present invention may be utilized in a wide range of industrial field such as automatic transfer machines, brakes, clutches, measuring instruments, etc.

We claim:

1. An apparatus for controlling rectilinear motion comprising:
    a shaft moving in connection with a substance performing rectilinear motion, the shaft having conduits;
    at least two sets of bag-shaped elastic bodies held on said shaft, each of said elastic bodies having a bottom;
    a friction piece fixed on each bottom of said bag-shaped elastic, bodies, the friction piece having an end face;
    a holder maintaining said elastic bodies on said shaft and providing gaps δ between said holder and the end faces of said friction pieces;
    a fixed housing for guiding the movement of said shaft and contacting said friction piece;
    a fluid supply source for supplying fluid through the conduits in said shaft to the bag-shaped space in said elastic body; and
    a control valve for simultaneously increasing the pressure of fluid within the bag-shaped spaces of two sets of said elastic bodies and alternately actuating said elastic bodies one after the other by the fluidic pressure pulses so as to cause said friction piece to frictionally contact and disengage said housing, thereby applying brake to said moving substance or causing the substance to perform a stepping motion.

2. A cylinder for controlling rectilinear motion, comprising:
    a fluid supply source;
    a fluidic pressure operated cylinder performing rectilinear motion, the cylinder having a barrel;
    a piston rod in said cylinder, the piston rod having conduits;
    at least two sets of bag-shaped elastic bodies held on the piston rod of said cylinder, each of said elastic bodies having a bottom;
    a friction piece fixed on each bottom of said bag-shaped elastic bodies, the friction piece having an end face;
    a holder maintaining said elastic bodies on said piston rod and providing gaps δ between said holder and the end faces of said friction pieces; and
    a fluid control valve for supplying fluid from the fluid supply source through the conduits in said piston rod to the bag-shaped spaces of said elastic bodies, said control valve simultaneously increasing the pressure of fluid within the bag-shaped spaces of two sets of said elastic bodies or alternately actuating said elastic bodies one after the other by the fluidic pressure pulses so as to cause said friction piece to frictionally contact or disengage the barrel of said cylinder, thereby applying brake to the piston or causing the piston to perform a stepping motion.

3. A cylinder for controlling rectilinear motion, comprising:
    a fluid supply source;
    a fluidic pressure operated cylinder performing rectilinear motion, the cylinder having a barrel;
    a piston rod in said cylinder, the piston rod having conduits;
    at least two sets of bag-shaped elastic bodies held on the piston rod of said cylinder, each of said elastic bodies having a bottom;
    a friction piece fixed on each bottom of said bag-shaped elastic bodies, the friction piece having an end face;
    an indicator provided on the longitudinal exterior surface of said piston rod;
    a detector arranged adjacent to said piston rod for detecting the position of said indicator, the detector having an output;
    a circuit to which the output from said detector is added;
    a holder maintaining said elastic body on the piston rod and providing gaps δ between said holder and the end face of said friction piece; and
    a fluid control valve for supplying fluid from the fluid supply source through the conduits in said piston rod to the bag-shaped spaces of said elastic bodies, said control valve simultaneously increasing the pressure of fluid within the bag-shaped spaces of two sets of said elastic bodies or alternately actuating said elastic bodies one after the other by the fluidic pressure pulses so as to cause said friction piece to frictionally contact or disengage the barrel of said cylinder, thereby applying brake to the rectilinear movement of the piston or causing the piston to perform a stopping motion.

* * * * *